(12) United States Patent
Tanaka

(10) Patent No.: US 11,199,916 B2
(45) Date of Patent: Dec. 14, 2021

(54) OPERATION SUPPORT DEVICE

(71) Applicant: Japan Display Inc., Tokyo (JP)

(72) Inventor: Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/003,583

(22) Filed: Aug. 26, 2020

(65) Prior Publication Data

US 2021/0064152 A1 Mar. 4, 2021

(30) Foreign Application Priority Data

Aug. 28, 2019 (JP) .............................. JP2019-156044

(51) Int. Cl.
*G06F 3/0362* (2013.01)
*G06F 3/044* (2006.01)
*G06F 3/039* (2013.01)

(52) U.S. Cl.
CPC .......... *G06F 3/0362* (2013.01); *G06F 3/0393* (2019.05); *G06F 3/044* (2013.01)

(58) Field of Classification Search
CPC ....... G06F 3/0362; G06F 3/044; G06F 3/0393
See application file for complete search history.

(56) References Cited

U.S. PATENT DOCUMENTS

| 2006/0256090 A1* | 11/2006 | Huppi | ..................... | A63F 13/02 |
| | | | | 345/173 |
| 2018/0217682 A1* | 8/2018 | Dangy Caye | ........... | G06F 3/014 |

FOREIGN PATENT DOCUMENTS

JP      2016-218682 A      12/2016

* cited by examiner

*Primary Examiner* — Hang Lin
(74) *Attorney, Agent, or Firm* — K&L Gates LLP

(57) ABSTRACT

An operation support device that supports an input operation to a coordinate input device for detecting a change in electrostatic capacitance, the operation support device, comprises: an operation member; a first rotation plate that moves in a vertical direction in conjunction with the operation member; and a first member that includes a conductive first shaft part that protrudes from the first rotation plate toward the coordinate input device, and a conductive first end part. In conjunction with a pressing operation performed on the operation member to a first stage, the first shaft part and the first end part come into contact with each other.

6 Claims, 15 Drawing Sheets

OPERATION SUPPORT DEVICE

CROSS-REFERENCE TO RELATED APPLICATIONS

This application claims priority from Japanese Application No. 2019-156044, filed on Aug. 28, 2019, the contents of which are incorporated by reference herein in its entirety.

BACKGROUND

1. Technical Field

The present disclosure relates to an operation support device that supports an input operation of an electrostatic-capacitance-type coordinate input device.

2. Description of the Related Art

Japanese Patent Application Laid-open Publication No. 2016-218682 (JP-A-2016-218682) discloses an operation knob (operation support device) that is mounted on a touch panel for detecting a change in the electrostatic capacitance or a change in the contact region, and that supports an input operation from the touch panel.

When the initialization process of a touch panel is activated in a state in which the operation knob disclosed in JP-A-2016-218682 is installed on the touch panel, the electrostatic capacitance of a contact part of the operation knob is handled as a reference value. In such a case, the touch panel does not detect the initialization position of the contact part of the operation knob. Consequently, even when the operation knob disclosed in JP-A-2016-218682 is rotated, the rotation angle cannot be detected, because the position of the contact part of the operation knob is unknown. Thus, in JP-A-2016-218682, the operation knob needs to be installed on the touch panel, after the initialization process of the touch panel is activated.

SUMMARY

An object of the present disclosure is to provide an installation operation support device that can start the initialization process of a coordinate input device, while the installation operation support device is mounted on the coordinate input device.

An operation support device according to one embodiment that supports an input operation to a coordinate input device for detecting a change in electrostatic capacitance is disclosed. The operation support device includes an operation member, a first rotation plate that moves in a vertical direction in conjunction with the operation member, and a first member that includes a conductive first shaft part that protrudes from the first rotation plate toward the coordinate input device, and a conductive first end part. In conjunction with a pressing operation performed on the operation member to a first stage, the first shaft part and the first end part come into contact with each other.

DETAILED DESCRIPTION

Figure 1:
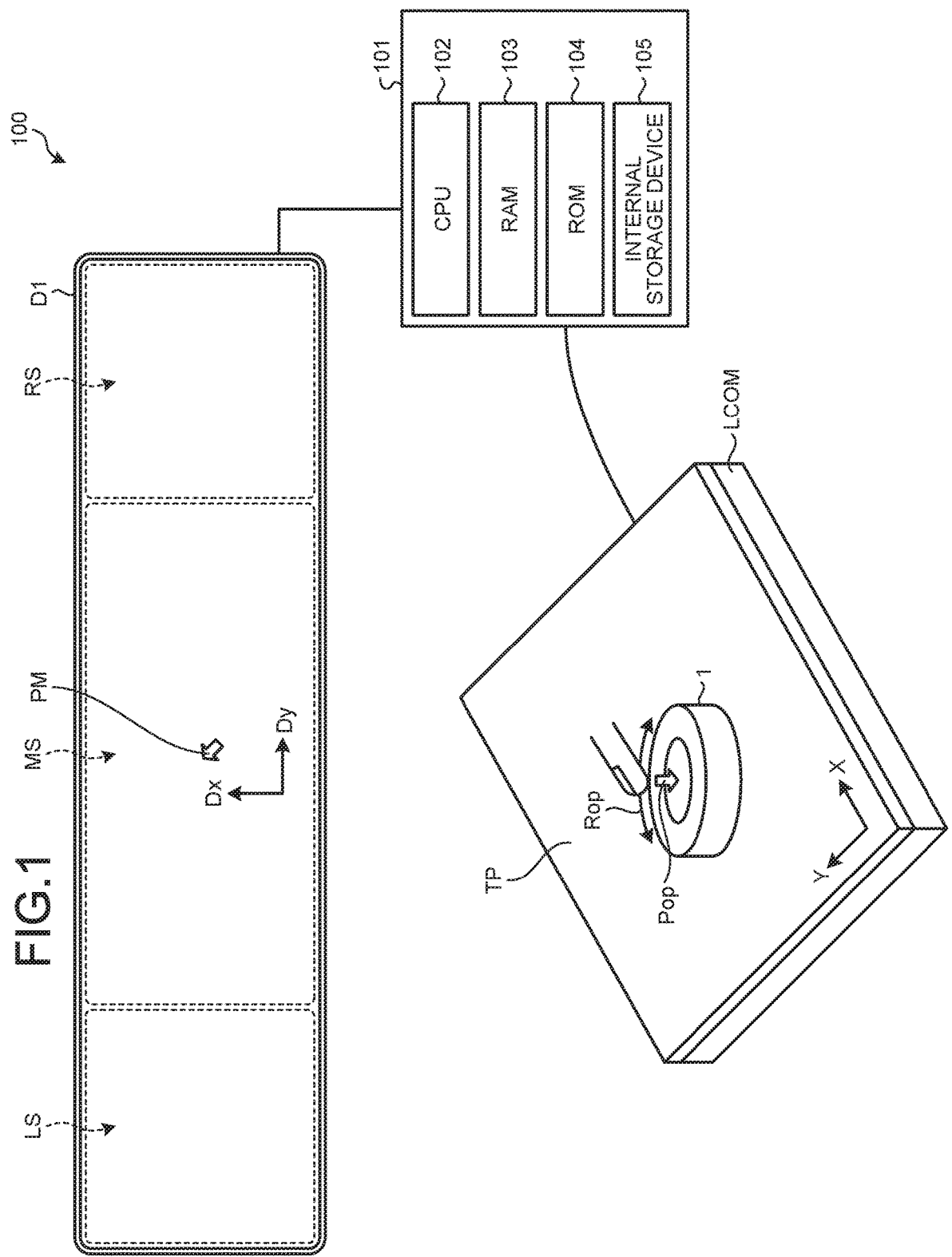
FIG. 1 is an explanatory diagram for explaining a configuration of an input system according to the present embodiment.

A mode (embodiment) for carrying out the present disclosure will now be described in detail with reference to the accompanying drawings. The present disclosure is not limited to the contents described in the following embodiment. The components described below include those that can be easily assumed by those skilled in the art, and those substantially the same. The components described below can be combined with one another as appropriate. The disclosure is merely an example, and the present disclosure naturally encompasses an appropriate modification maintaining the gist of the disclosure that is easily conceivable by those skilled in the art. To further clarify the description, a width, a thickness, a shape, and the like of each component may be schematically illustrated in the drawings as compared with an actual aspect. However, this is merely an example and interpretation of the present disclosure is not limited thereto. The same element as that described in the drawing that has already been discussed is denoted by the same reference numeral throughout the present specification and the drawings, and detailed description thereof will be omitted as appropriate.

Input System

FIG. 1 is an explanatory diagram for explaining a configuration of an input system according to the present embodiment. As illustrated in FIG. 1, an input system 100 includes a display device D1, a control device 101, a coordinate input device TP, and an operation knob 1, which is an operation support device. The Dx direction is a direction in the plane of the display device D1, and the Dy direction is a direction orthogonal to the Dx direction.

For example, the display device D1 includes a display region MS, a display region LS, and a display region RS. A pointer PM is displayed on the display device D1.

The control device 101 is what is called a computer. The control device 101 includes a central processing unit (CPU) 102, a random access memory (RAM) 103, a read only memory (ROM) 104, and an internal storage device 105 such as a hard disk drive (HDD). The coordinate input device TP is coupled to the control device 101 as an input unit of the control device 101.

The ROM 104 stores therein computer programs such as a Basic Input Output System (BIOS).

The RAM 103 is the main memory capable of reading and writing computer programs and data, and provides a working area. The internal storage device 105 stores therein a plurality of computer programs for controlling the display device D1 and the coordinate input device TP.

The CPU 102 reads out and executes the computer programs stored in the internal storage device 105 or the RAM 103. On the basis of the calculation result of the CPU 102, the control device 101 outputs an image to be displayed on the display device D1 and an image on the basis of the output of the coordinate input device TP, to the display device D1.

In the CPU 102, an image on which arithmetic processing required for displaying graphics is performed is displayed on the display device D1. In the CPU 102, the image on which arithmetic processing required for displaying graphics is performed may also be displayed on the coordinate input device TP. The control device 101, which is a computer, acquires signals from the coordinate input device TP, performs touch position arithmetic processing, and performs image processing on the basis of the calculation result.

For example, the coordinate input device TP is what is called a touch panel having a coordinate input function. On the XY plane, the coordinate input device TP displays an image, and receives a change in the electrostatic capacitance as coordinate input. The coordinate input device TP is overlapped with a display device LCOM.

The operation knob 1 is an operation support device of the coordinate input device TP. The coordinates of the operation knob 1 on the XY plane are detected by the coordinate input device TP. A rotation operation $R_{OP}$ of the operation knob 1 is detected by the coordinate input device TP. A pressing operation $P_{OP}$ of the operation knob 1 is also detected by the coordinate input device TP.

For example, in the input system 100, the pointer PM moves to one of the display region MS, the display region LS, and the display region RS, by the rotation operation $R_{OP}$ of the operation knob 1. For example, when the pressing operation $P_{OP}$ is applied to the operation knob 1, the display region MS where the pointer PM is present at the time when the pressing operation $P_{OP}$ is applied to the operation knob 1 is selected. The display region MS will then be a target region for the subsequent processes.

Operation Support Device

The operation knob 1 is formed in a hollow cylindrical shape, and has a size that fits in the palm of an operator. The operation knob 1 may not have a hollow portion, and the hollow portion of the operation knob 1 may also be used as a button for performing the pressing operation $P_{OP}$.

Figure 2:
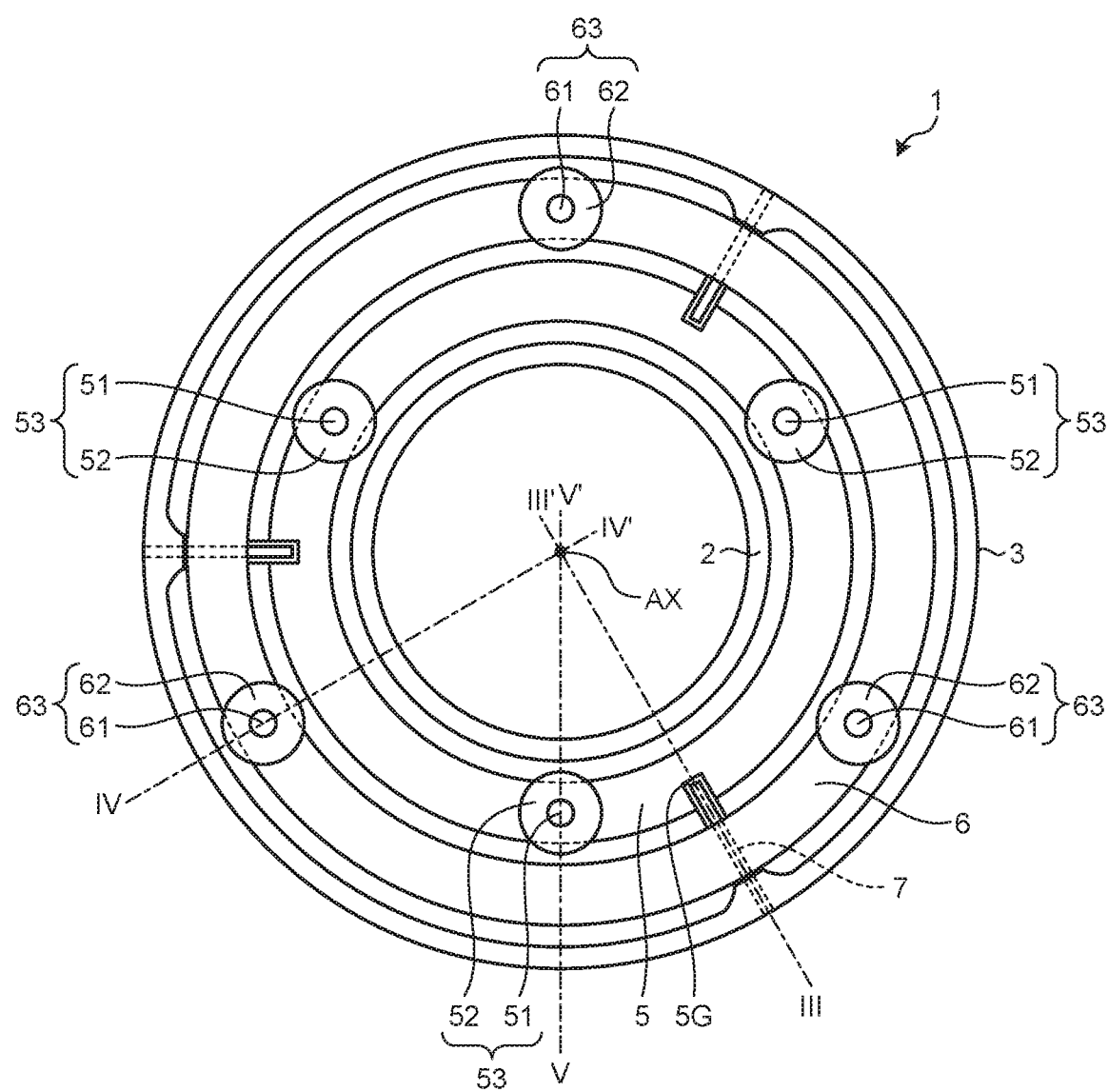
FIG. 2 is a plan view illustrating the rear surface of an operation support device of the present embodiment.
Figure 3:
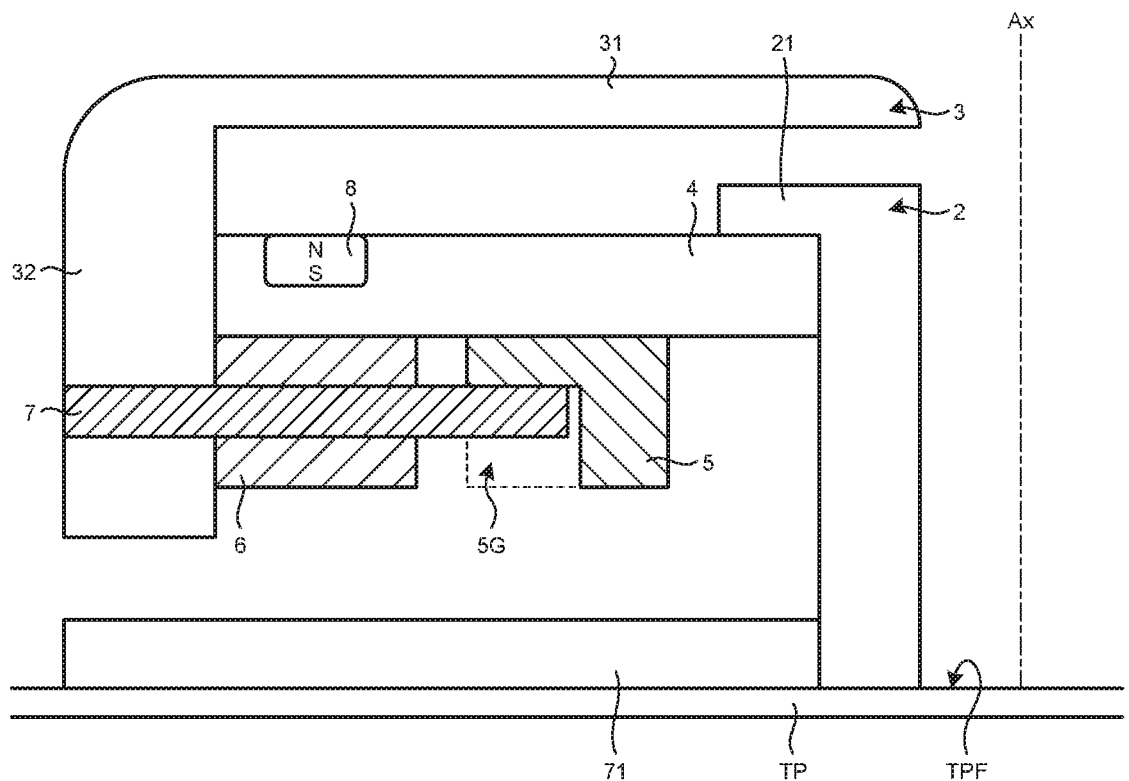
FIG. 3 is a sectional view for explaining a state in which an operation member is not pressed down, in the cross section cut along line III-III' in FIG. 2.
Figure 4:
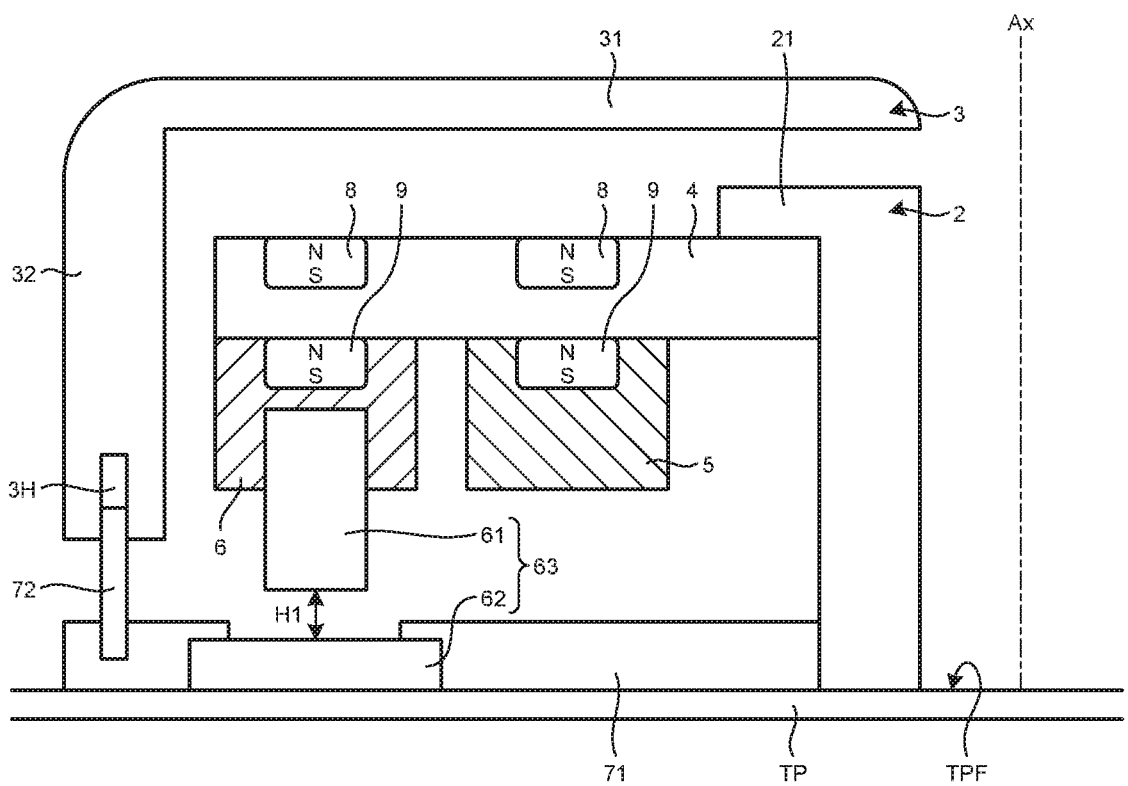
FIG. 4 is a sectional view for explaining a state in which the operation member is not pressed down, in the cross section cut along line IV-IV' in FIG. 2.
Figure 5:
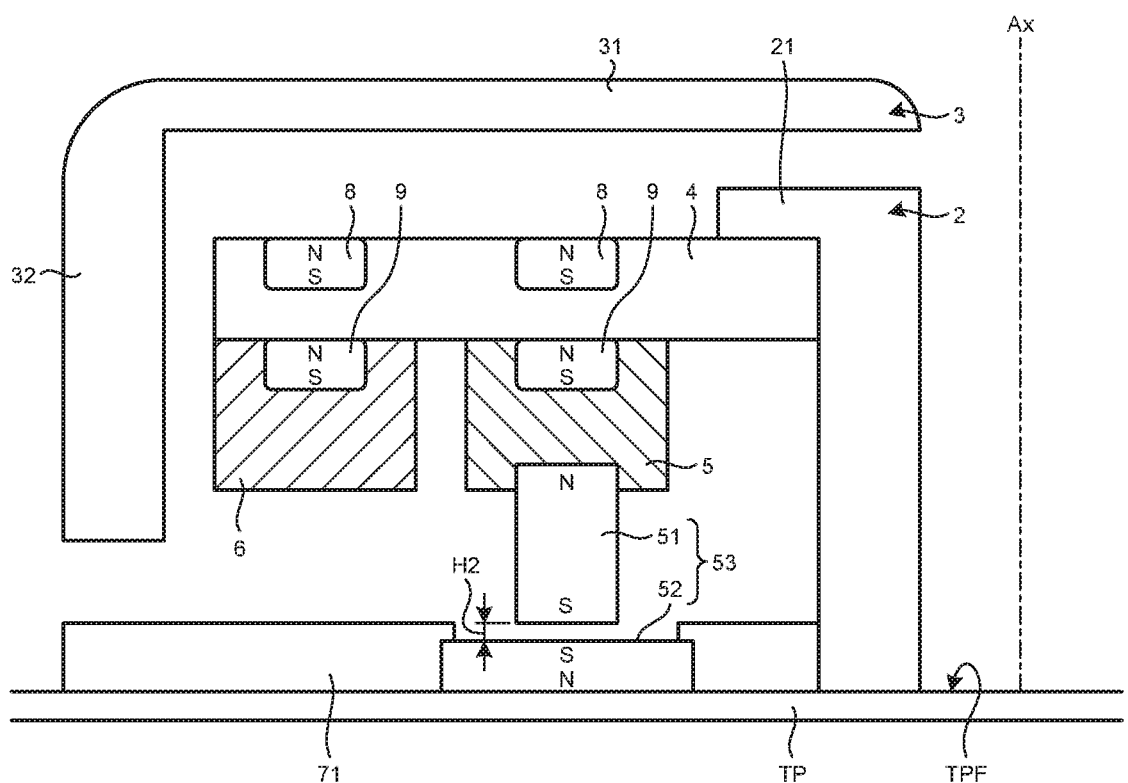
FIG. 5 is a sectional view for explaining a state in which the operation member is not pressed down, in the cross section cut along line V-V' in FIG. 2.
Figure 6:
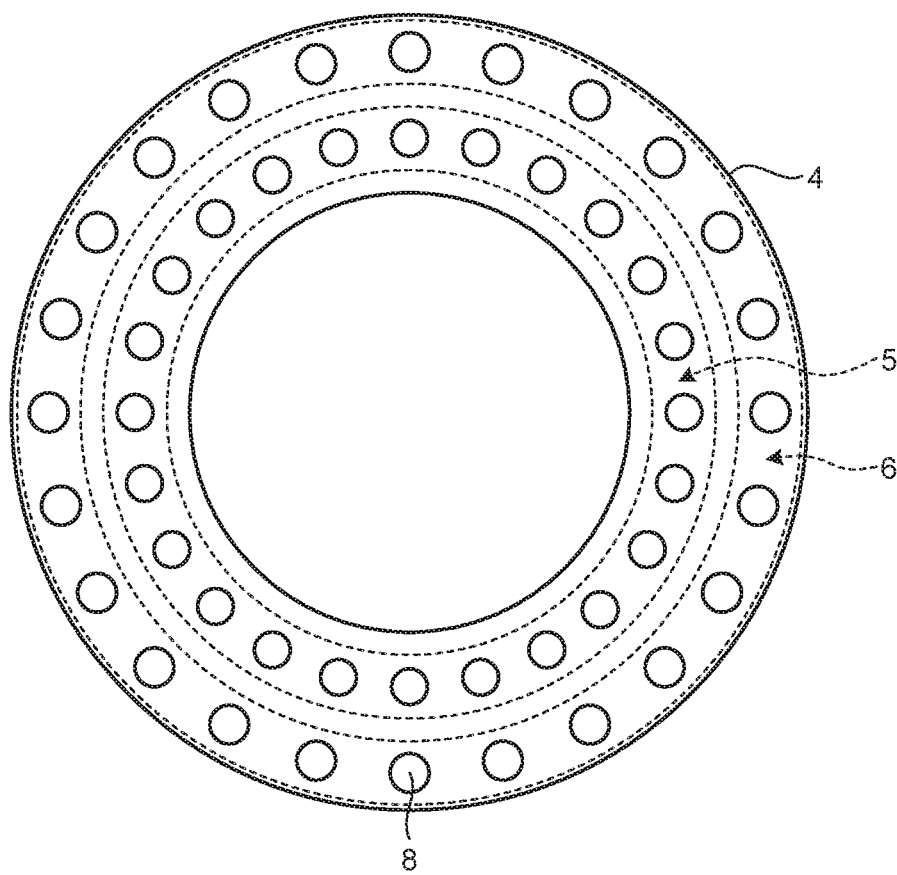
FIG. 6 is a plan view illustrating a plane of a supporting plate according to the present embodiment.
Figure 7:
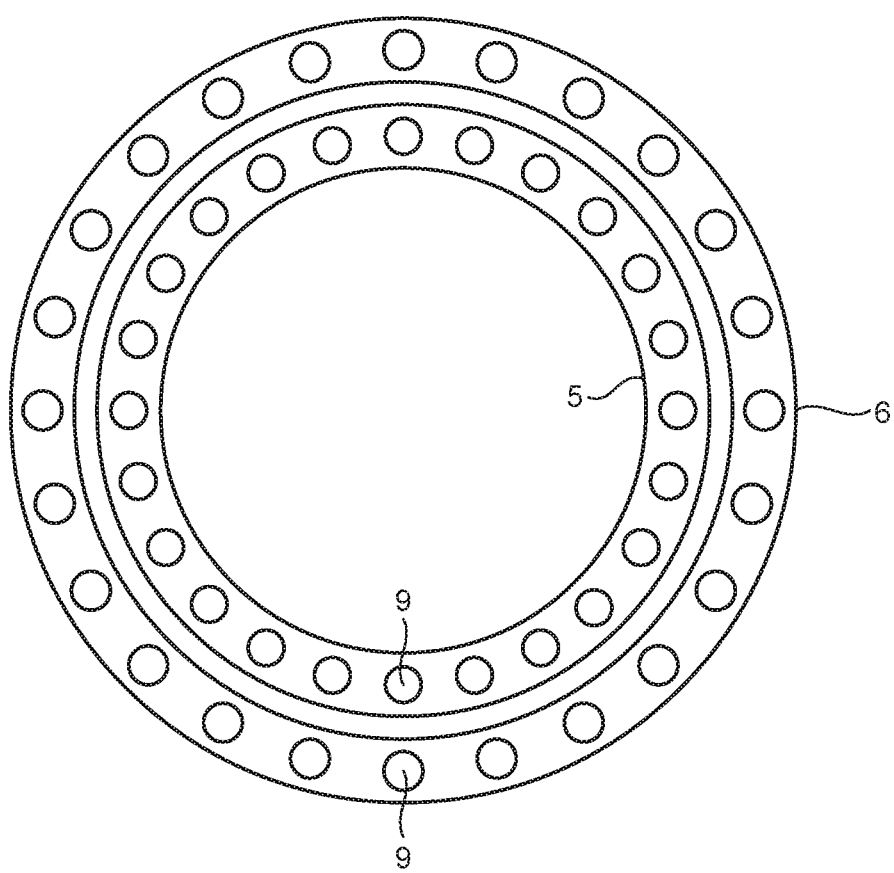
FIG. 7 is a plan view illustrating a first rotation plate and a second rotation plate according to the present embodiment.

FIG. 2 is a plan view illustrating the rear surface of an operation support device of the present embodiment. FIG. 3 is a sectional view for explaining a state in which an operation member is not pressed down, in the cross section cut along line III-III' in FIG. 2. FIG. 4 is a sectional view for explaining a state in which the operation member is not pressed down, in the cross section cut along line IV-IV' in FIG. 2. FIG. 5 is a sectional view for explaining a state in which the operation member is not pressed down, in the cross section cut along line V-V' in FIG. 2. FIG. 6 is a plan view illustrating a plane of a supporting plate according to the present embodiment. FIG. 7 is a plan view illustrating a first rotation plate and a second rotation plate according to the present embodiment.

As illustrated in FIG. 2, the operation knob 1 includes a main axis supporting member 2, a supporting plate 4, a first rotation plate 5, a second rotation plate 6, three first members 53, three second members 63, and a terminal holding plate 71 (see FIG. 3). In FIG. 2, illustration of the terminal holding plate 71 is omitted, and only the positions of a first end part 52 and a second end part 62 are illustrated. For example, the first members 53 are disposed around a center axis Ax of the main axis supporting member 2 at every 120 degrees. For example, the second members 63 are disposed around the center axis Ax at every 120 degrees.

As illustrated in FIG. 3, the main axis supporting member 2 is a hollow cylindrical member. The main axis supporting member 2 is disposed on an upper surface TPF of the coordinate input device TP. For example, the main axis supporting member 2 is formed of insulating resin. Consequently, even when the main axis supporting member 2 is mounted on the upper surface TPF of the coordinate input device TP, the coordinate input device TP does not detect the main axis supporting member 2. The lower end part of the main axis supporting member 2 comes into contact with the coordinate input device TP. A positioning part 21 that extends toward the outside in the radial direction is formed on the upper end part of the main axis supporting member 2.

An operation member 3 includes an annular upper surface part 31 that covers the main axis supporting member 2 and the supporting plate 4. The operation member 3 also includes a side surface part 32 that covers the second rotation plate 6 from the outside in the radial direction. The operation member 3 is made of a material having conductivity.

As illustrated in FIG. 2, FIG. 3, and FIG. 6, the supporting plate 4 is an annular plate-like member formed of insulating resin. The supporting plate 4 is an annular member disposed on the outer periphery of the main axis supporting member 2. A first magnet 8 is embedded in the upper surface of the supporting plate 4. A plurality of the first magnets 8 are aligned in the circumferential direction. As illustrated in FIG. 5, the first magnets 8 are aligned such that the same polarity (for example, N-pole) faces upward. Each of the first magnets 8 is a member that can be formed in a small size, that has a high machining accuracy, and that can be used in a wide temperature range. For example, the first magnet 8 is a neodymium magnet.

As illustrated in FIG. 2 and FIG. 7, the first rotation plate 5 and the second rotation plate 6 are annular plate-like members. As illustrated in FIG. 4, FIG. 5, and FIG. 7, a second magnet 9 is embedded in the upper surface of the first rotation plate 5 and the second rotation plate 6. The second magnet 9 is a member that can be formed in a small size, that has a high machining accuracy, and that can be used in a wide temperature range. For example, the second magnet 9 is a neodymium magnet. A plurality of the second magnets 9 are aligned in the circumferential direction. As illustrated in FIG. 5, the first magnets 8 are aligned such that the same polarity (for example, N-pole) faces upward. When the first magnet 8 and the second magnet 9 are overlapped with each other in the vertical direction, different polarities face each other. Consequently, the first magnet 8 and the second magnet 9 attract each other, and an attractive force acts between the supporting plate 4 and the first rotation plate 5, and between the supporting plate 4 and the second rotation plate 6. In a state in which the operation member 3 is not pressed down, the supporting plate 4 and the first rotation plate 5 come into contact with each other, and the supporting plate 4 and the second rotation plate 6 come into contact with each other.

The supporting plate 4 is interposed between the first magnet 8 and the second magnet 9. Thus, it is possible to adjust the attractive force between the first magnet 8 and the second magnet 9 with the thickness of the supporting plate 4. It is also possible to adjust the attractive force, by setting the size and the number of pieces of the first magnet 8 and the second magnet 9 to be mounted.

The second rotation plate 6 is made of a conductive material having smaller magnetic permeability than that of carbon steel. In the present embodiment, the second rotation plate 6 is made of copper-zinc alloy. When the second rotation plate 6 is made of a material the magnetic permeability of which is equal to or more than that of carbon steel, a magnetic path that shields the attractive force between the first magnet 8 and the second magnet 9 will be formed. Consequently, there is a possibility that a rotational torque (detent torque) according to the rotation operation $R_{OP}$ of the operation knob 1 may be lost. The second rotation plate 6 may be made of an insulating material, but when the second rotation plate 6 is made of a conductive material, it is possible to increase the sensitivity of the second member 63 in the coordinate input device TP.

As illustrated in FIG. 2, the first rotation plate 5 is an annular plate-like member disposed inside the second rotation plate 6 in the radial direction. The first rotation plate 5 may be made of an insulating material, but when the first rotation plate 5 is made of a conductive material, it is possible to increase the sensitivity of the first member 53 in the coordinate input device TP.

As illustrated in FIG. 2, a plurality of coupling members 7, which are columnar members, are provided in the circumferential direction. The coupling members 7 also extend toward the center axis Ax. For example, the coupling members 7 are metal pins. As illustrated in FIG. 2 and FIG. 3, by penetrating through the side surface part of the operation member 3 and the second rotation plate 6, each of the coupling members 7 couples the side surface part of the operation member 3 and the second rotation plate 6. The tip end part of the coupling member 7 that protrudes from the inside of the second rotation plate 6 in the radial direction is inserted into a groove 5G provided in the lower surface of the first rotation plate 5. Consequently, according to the rotation operation $R_{OP}$ of the operation knob 1, the coupling member 7 couples the second rotation plate 6 and the first rotation plate 5.

As illustrated in FIG. 4, the second member 63 is fixed to the coordinate input device TP side of the second rotation plate 6. The second member 63 protrudes from the second rotation plate 6 toward the coordinate input device TP. The second member 63 includes a columnar-like second shaft part 61 and a disc-like second end part 62. The second shaft part 61 does not affect the detection sensitivity of the coordinate input device TP. The second end part 62 is formed in a size suitable for detecting the sensitivity of the coordinate input device TP. The second shaft part 61 and the second end part 62 are conductive members, and for example, are made of copper-zinc alloy.

As illustrated in FIG. 5, the first member 53 is fixed to the coordinate input device TP side of the first rotation plate 5. The first member 53 protrudes from the first rotation plate 5 toward the coordinate input device TP. The first member 53 includes a columnar-like first shaft part 51 and the disc-like first end part 52. The first shaft part 51 and the first end part 52 are members that can be formed in a small size, that has a high machining accuracy, and that can be used in a wide temperature range. For example, the first shaft part 51 and the first end part 52 are neodymium magnets. As illustrated in FIG. 5, a plurality of the first shaft parts 51 are aligned such that the same polarity (for example, N-pole) faces upward. A plurality of the first end parts 52 are alighted such that the same polarity (for example, S-pole) faces upward. The polarity of the lower part of the first shaft part 51 opposite to the first end part 52 is the same polarity as that of the upper surface of the first end part 52.

A repulsive force is generated between the first shaft part 51 and the first end part 52. In a state in which the operation member 3 is not pressed down, the first shaft part 51 presses the first rotation plate 5 and the supporting plate 4 upward, and brings the upper surface of the supporting plate 4 into contact with the positioning part 21 of the main axis supporting member 2.

As illustrated in FIG. 2, the second members 63 are disposed around the center axis Ax, at positions shifted by 60 degrees from the first members 53. The second members 63 may also be disposed around the center axis Ax at the same positions as those of the first members 53 in the circumferential direction. In the present embodiment, the second members 63 are provided at positions other than on the line connecting the center axis Ax of the main axis supporting member 2 and each of the first members 53. By disposing the second members 63 around the center axis Ax at positions different from those of the first members 53 in the circumferential direction, it is possible to dispose the second end part 62 and the first end part 52 such that the second end part 62 and the first end part 52 do not interfere with each other, even though the size thereof is increased.

In the operation knob 1, the second magnets 9 that generate an attractive force with respect to the first magnets 8 are disposed at positions overlapping with the first magnets 8 in the vertical direction, in the circumferential direction of one surface of the second rotation plate 6.

Consequently, when the rotation operation $R_{OP}$ is not performed on the operation knob 1, the relative rotational position between the second rotation plate 6 and the supporting plate 4 is maintained, by the attractive force between the first magnets 8 and the second magnets 9. When the rotation operation $R_{OP}$ is performed on the operation knob 1, the operation member 3 is rotated with respect to the main axis supporting member 2. Each of the second magnets 9 that generates an attractive force with respect to the first magnet 8 at a position overlapping with the first magnet 8 in the vertical direction moves, and generates an attractive force with respect to the next adjacent first magnet 8. Consequently, a tactile feedback corresponding to the rotation operation $R_{OP}$ of the operation knob 1 is transmitted to the operator of the operation knob 1. In other words, with the rotation operation $R_{OP}$ of the operation knob 1, what is called a click feeling is transmitted to the operator of the operation knob 1.

As illustrated in FIG. 3, FIG. 4, and FIG. 5, the terminal holding plate 71 is an annular member that is mounted on the upper surface TPF of the coordinate input device TP, and that is disposed on the outer periphery of the main axis supporting member 2. The terminal holding plate 71 is formed of insulating resin. Consequently, even when the terminal holding plate 71 is mounted on the upper surface TPF of the coordinate input device TP, the coordinate input device TP does not detect the terminal holding plate 71. The operation member 3 and the terminal holding plate 71 are coupled by a coupling member 72 illustrated in FIG. 4. For example, the coupling member 72 is a metal pin. The coupling member 72 is located on the outer diameter side of the terminal holding plate 71, and is standing vertically upright on the terminal holding plate 71 at the position opposite to the side surface part 32 of the operation member 3. The upper end of the coupling member 72 is inserted into an insertion hole 3H formed on the side surface part 32 of the operation member 3. A plurality of the coupling members 72 are disposed around the center axis Ax of the main axis supporting member 2 at every 120 degrees.

As illustrated in FIG. 4 and FIG. 5, the first end part 52 of the first member 53 and the second end part 62 of the second member 63 are embedded in the terminal holding plate 71, and the upper and lower surfaces thereof are exposed. As illustrated in FIG. 4, an opening of height H1 is formed between the second end part 62 and the second shaft part 61 of the second member 63. Consequently, the second end part 62 is not electrically coupled to any reference potential and is in a floating state. As illustrated in FIG. 4, an opening of height H2 is formed between the first end part 52 and the first shaft part 51 of the first member 53. Consequently, the first end part 52 is not electrically coupled to any reference potential and is in a floating state. The height H2 of the opening is smaller than the height H1 of the opening. In a state in which the operation member 3 is not pressed down, the supporting plate 4 and the first rotation plate 5 come into contact with each other, and the supporting plate 4 and the second rotation plate 6 come into contact with each other. In a state in which the operation member 3 is not pressed down, the sensibility of the coordinate input device TP is set such that the coordinate input device TP does not detect the first end part 52 of the first member 53 and the second end part 62 of the second member 63.

Figure 8:
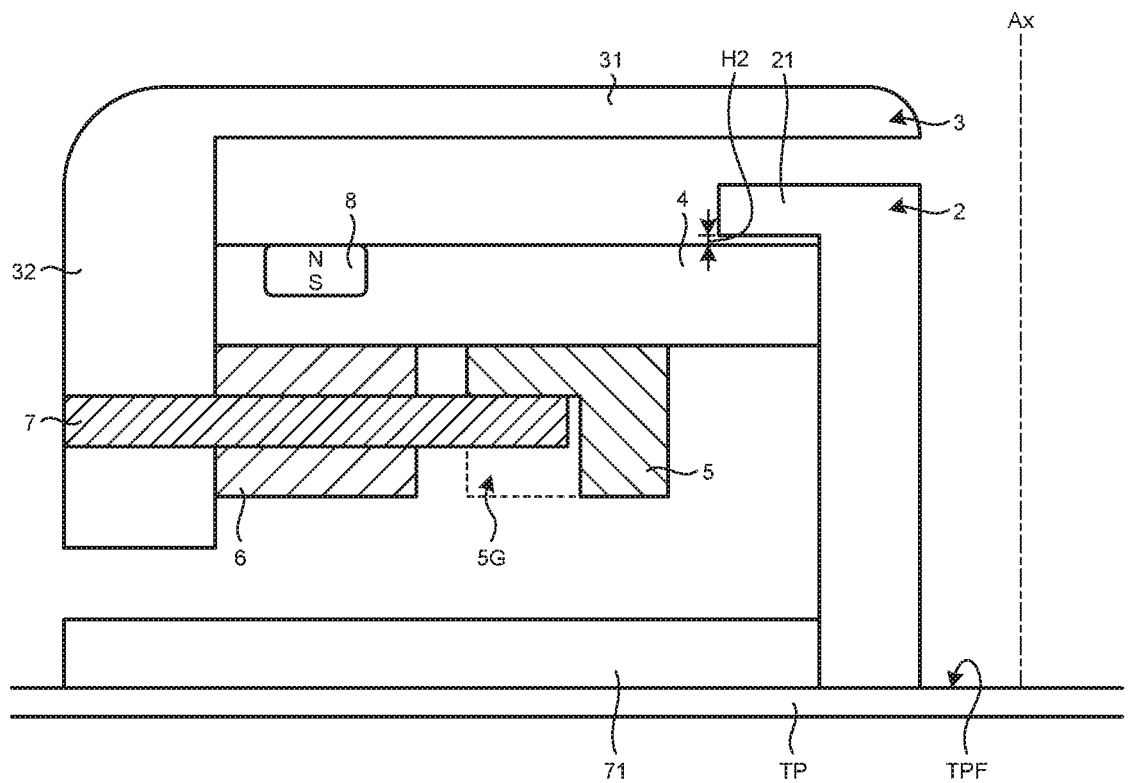
FIG. 8 is a sectional view for explaining a state in which the operation member is pressed down to a first stage, in the cross section cut along the line III-III' in FIG. 2.
Figure 9:
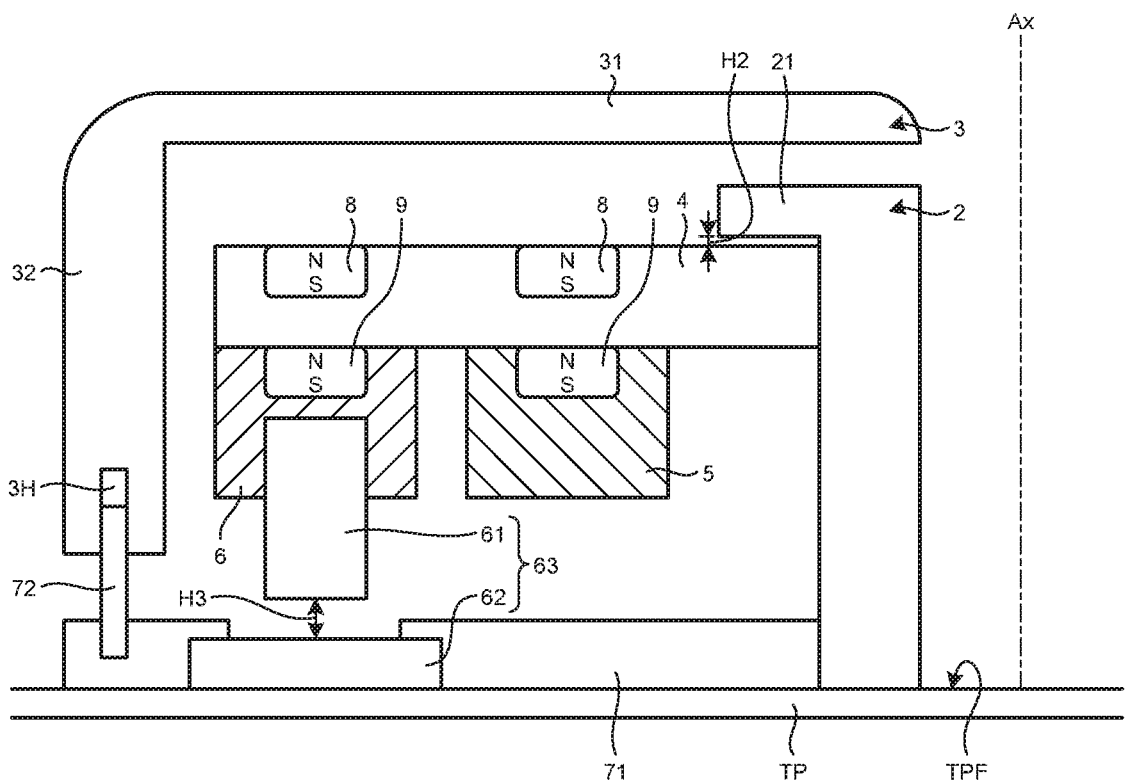
FIG. 9 is a sectional view for explaining a state in which the operation member is pressed down to the first stage, in the cross section cut along the line IV-IV' in FIG. 2.
Figure 10:
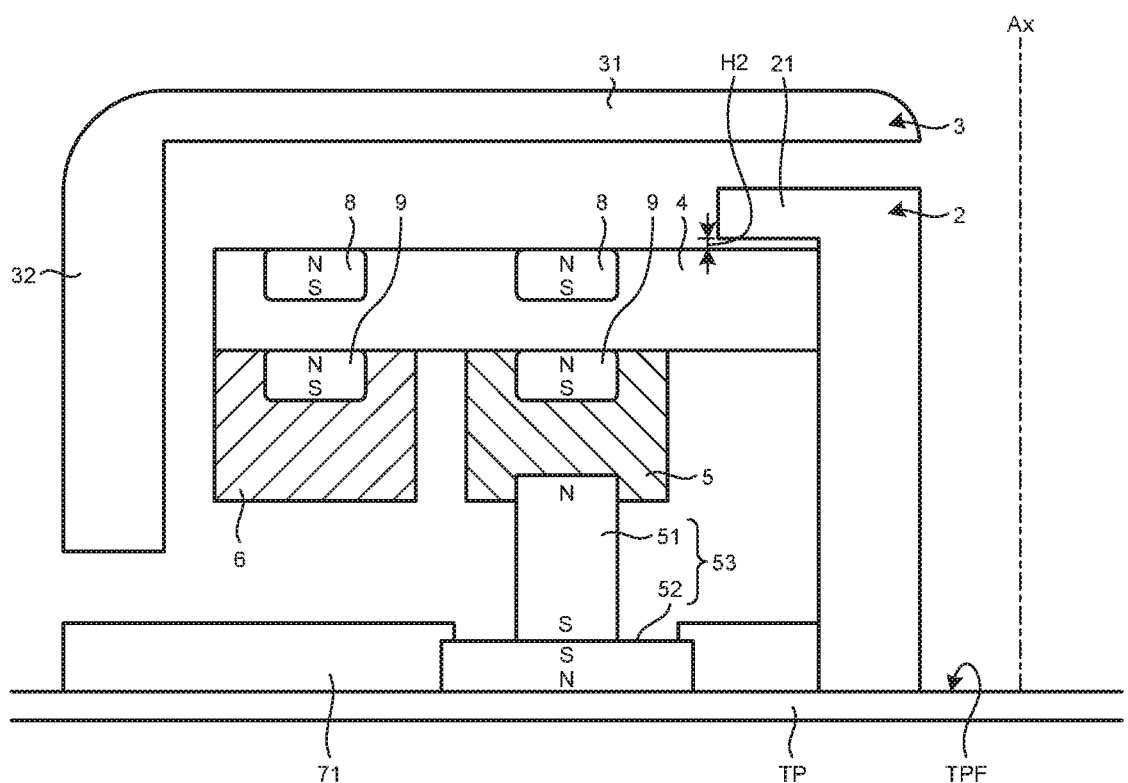
FIG. 10 is a sectional view for explaining a state in which the operation member is pressed down to the first stage, in the cross section cut along the line V-V' in FIG. 2.

FIG. 8 is a sectional view for explaining a state in which the operation member is pressed down to a first stage, in the cross section cut along the line III-III' in FIG. 2. FIG. 9 is a sectional view for explaining a state in which the operation member is pressed down to the first stage, in the cross section cut along the line IV-IV' in FIG. 2. FIG. 10 is a sectional view for explaining a state in which the operation member is pressed down to the first stage, in the cross section cut along the line V-V' in FIG. 2. FIG. 8, FIG. 9, and FIG. 10 each illustrate a state in which the operation member 3 is pressed down to the first stage.

When a hand is placed on the operation member 3, the operation member 3 is pressed down to the first stage, by the weight of the hand. As illustrated in FIG. 8, when the operation member 3 is pressed down, the second rotation plate 6 is pressed down via the coupling member 7. Because the first magnet 8 and the second magnet 9 attract to each other, an attractive force acts between the supporting plate 4 and the second rotation plate 6. When the second rotation plate 6 is pressed down, the supporting plate 4 is also pressed down. When the supporting plate 4 is pressed down, the first rotation plate 5 is also pressed down. When the first rotation plate 5 is pressed down, the first shaft part 51 is also pressed down, and as illustrated in FIG. 10, the first shaft part 51 and the first end part 52 come into contact with each other. Consequently, the upper surface of the supporting plate 4 and the positioning part 21 of the main axis supporting member 2 are separated to form an opening of height H2.

As illustrated in FIG. 9, an opening of height H3 is formed between the second end part 62 and the second shaft part 61 of the second member 63. The height H3 is a difference obtained by subtracting the height H2 from the height H1 described above.

Figure 11:
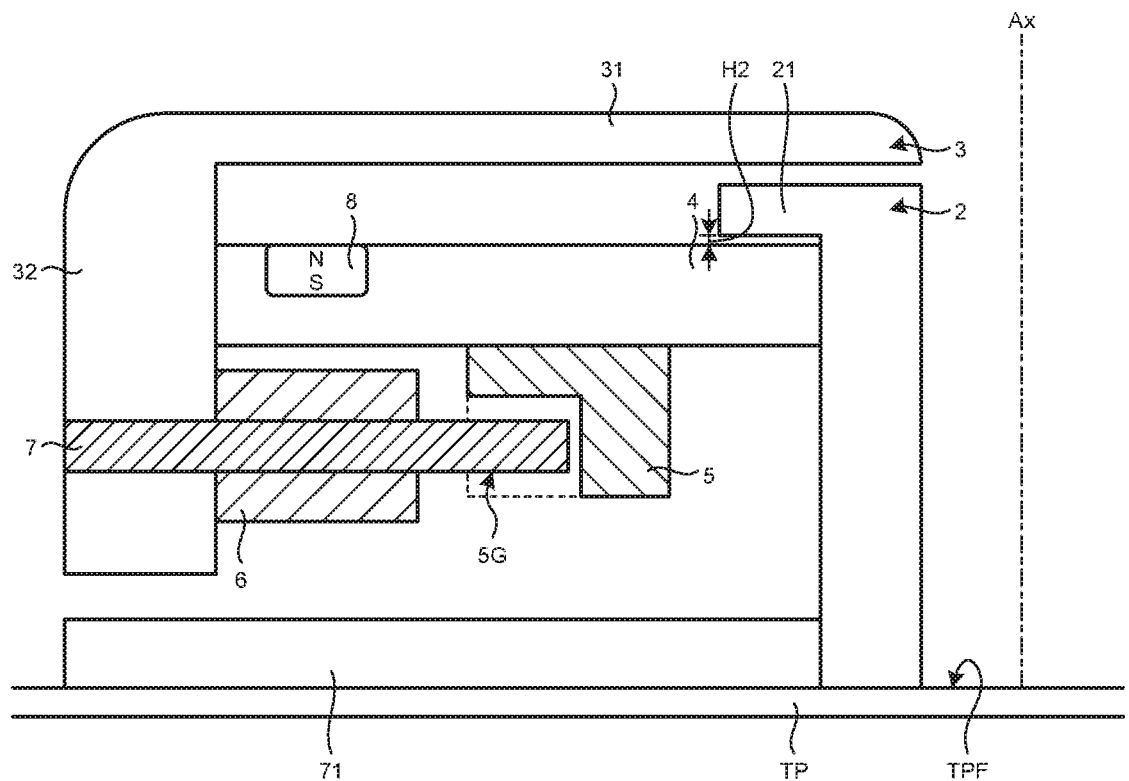
FIG. 11 is a sectional view for explaining a state in which the operation member is pressed down to a second stage, in the cross section cut along the line III-III' in FIG. 2.
Figure 12:
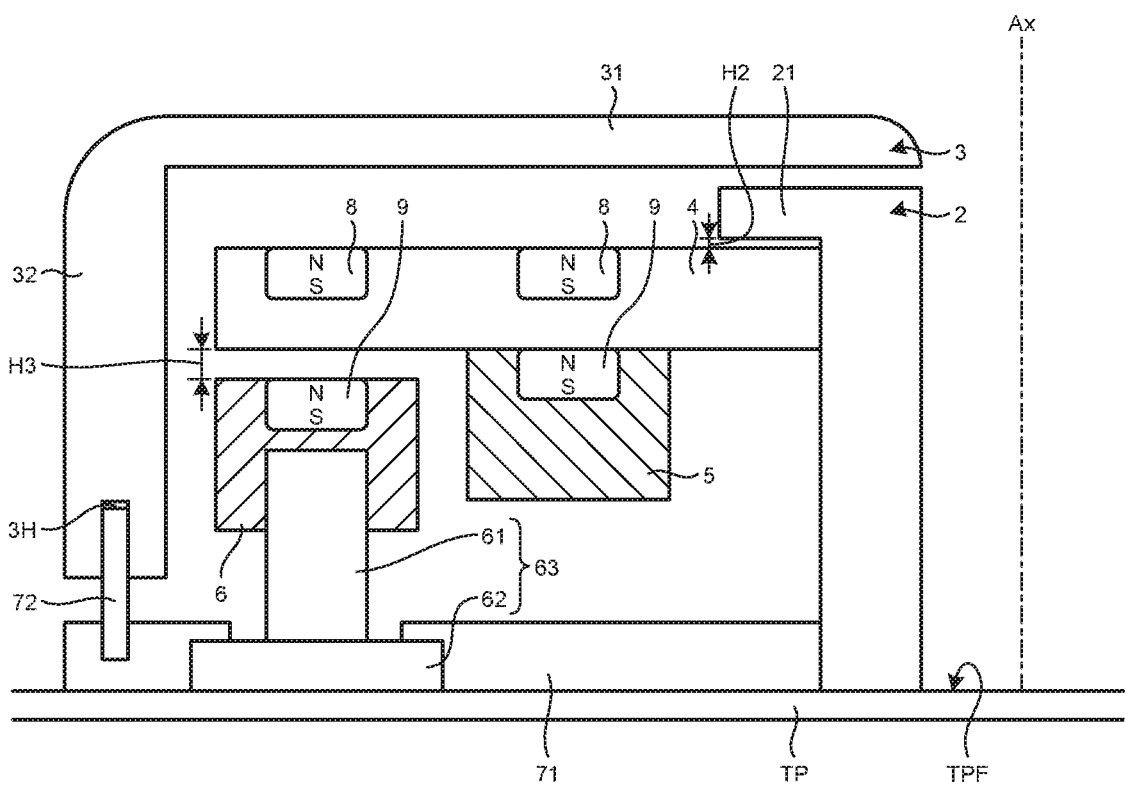
FIG. 12 is a sectional view for explaining a state in which the operation member is pressed down to the second stage, in the cross section cut along the line IV-IV' in FIG. 2.
Figure 13:
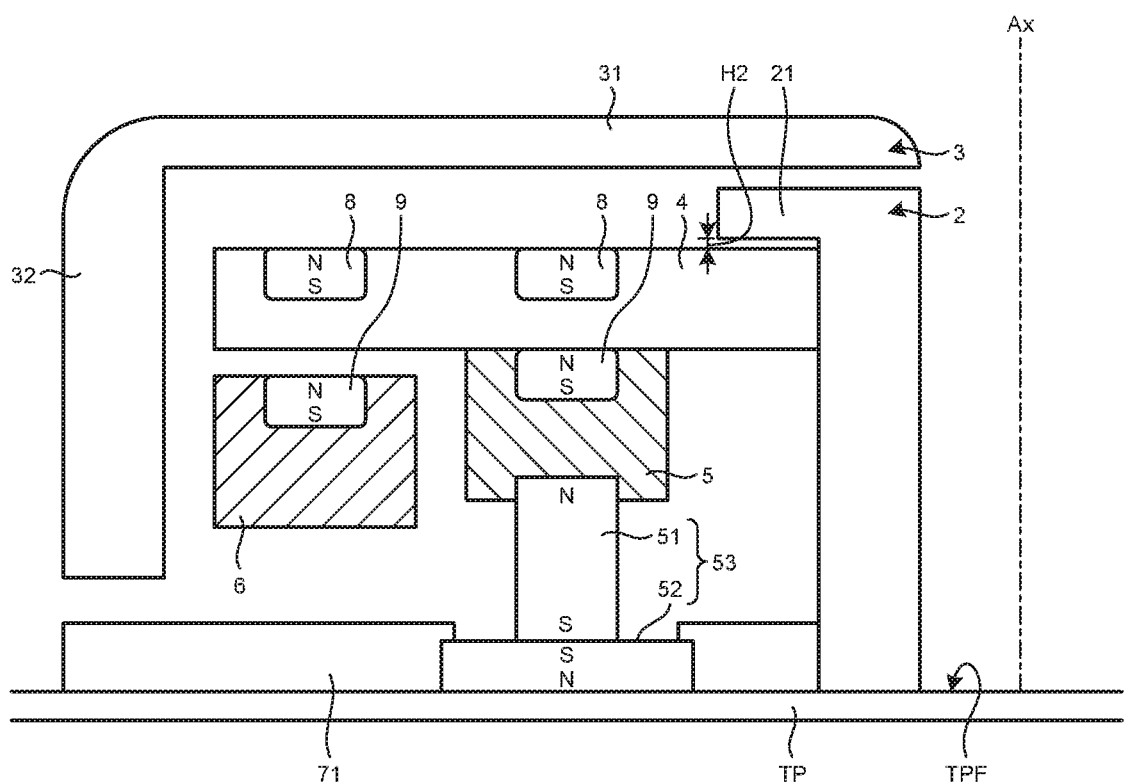
FIG. 13 is a sectional view for explaining a state in which the operation member is pressed down to the second stage, in the cross section cut along the line V-V' in FIG. 2.

FIG. 11 is a sectional view for explaining a state in which the operation member is pressed down to a second stage, in the cross section cut along the line III-III' in FIG. 2. FIG. 12 is a sectional view for explaining a state in which the operation member is pressed down to the second stage, in the cross section cut along the line IV-IV' in FIG. 2. FIG. 13 is a sectional view for explaining a state in which the operation member is pressed down to the second stage, in the cross section cut along the line V-V' in FIG. 2. FIG. 8, FIG. 9, and FIG. 10 each illustrate a state in which the operation member 3 is pressed down to the second stage, by the pressing operation $P_{OP}$ of the operation knob 1. As illustrated in FIG. 11, the supporting plate 4 and the second rotation plate 6 are separated from each other.

As illustrated in FIG. 11, even when the supporting plate 4 and the second rotation plate 6 are separated from each other, the tip end part of the coupling member 7 is inserted into the groove 5G provided in the lower surface of the first rotation plate 5. Consequently, even when the operation member 3 is rotated in a state in which the operation member 3 is pressed down, the second rotation plate 6 and the first rotation plate 5 rotate in conjunction with the rotation of the operation member 3.

As illustrated in FIG. 12, when the operation member 3 is pressed down to the second stage from the state in which the operation member 3 is not pressed down, the second shaft part 61 and the second end part 62 come into contact with each other. As illustrated in FIG. 13, the groove 5G provided in the lower surface of the first rotation plate 5 does not block the downward operation of the coupling member 7 relative to the first rotation plate 5. Consequently, when the operation member 3 is pressed down to the second stage, the second rotation plate 6 is also pressed down. However, even when the operation member 3 is pressed down to the second stage, because the first shaft part 51 and the first end part 52 are brought into contact with each other, the first rotation plate 5 does not move. Consequently, the positions of the supporting plate 4 and the first rotation plate 5 do not change, and the second rotation plate 6 separates from the supporting plate 4. Thus, when the second shaft part 61 and the second end part 62 come into contact with each other, an opening of height H3 is formed between the supporting plate 4 and the second rotation plate 6.

As described above, because the first magnet 8 and the second magnet 9 attract to each other, an attractive force acts between the supporting plate 4 and the second rotation plate 6. Thus, when the pressing operation $P_{OP}$ of the operation knob 1 is cancelled, the second rotation plate 6 is adsorbed to the supporting plate 4, and returns to the state in which the operation member 3 is not pressed down as illustrated in FIG. 3 to FIG. 5.

Figure 14:
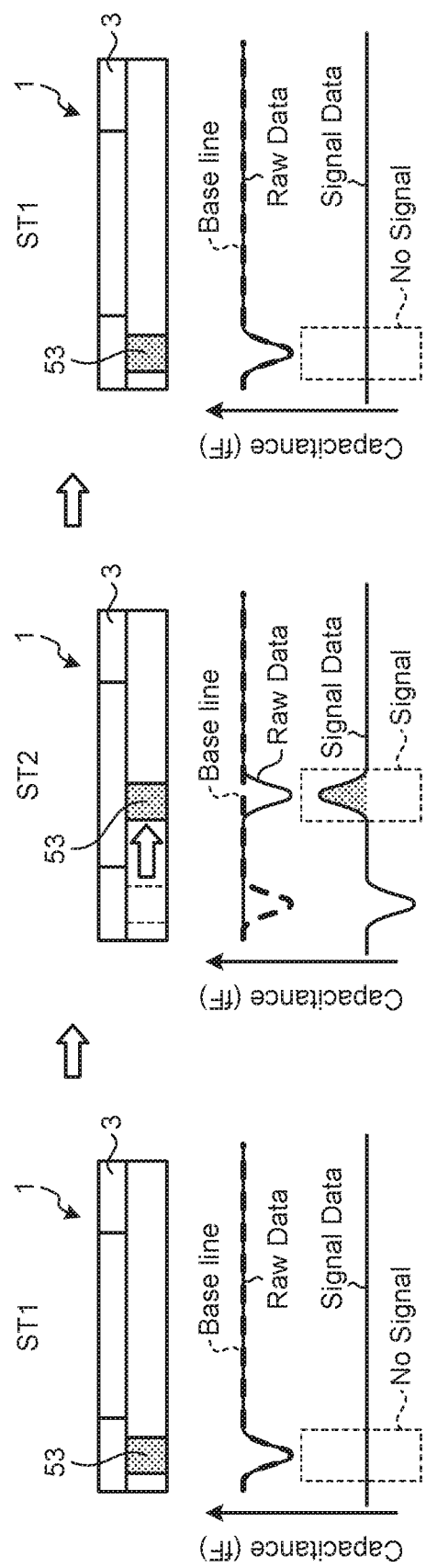
FIG. 14 is an explanatory diagram for schematically explaining the capacitance detected by a second member, when the initialization process of a coordinate input device is started, while the operation support device is mounted on the coordinate input device.
Figure 15:
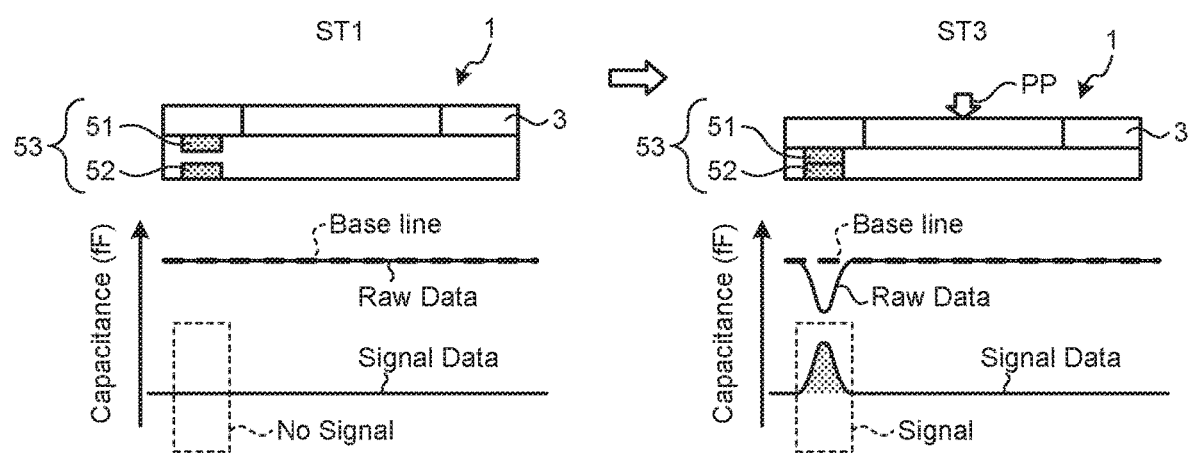
FIG. 15 is an explanatory diagram for schematically explaining the capacitance detected by a first member, when the initialization process of the coordinate input device is started, while the operation support device is mounted on the coordinate input device.
Figure 16A:
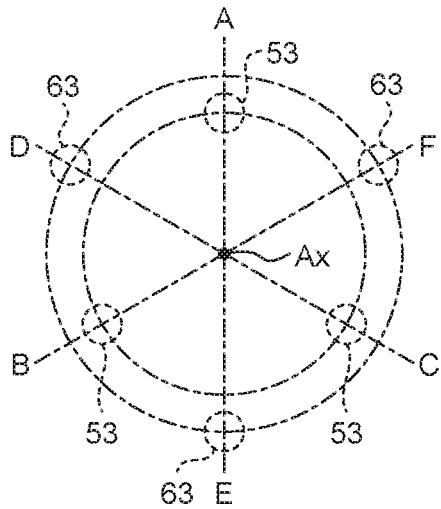
FIG. 16A is a plan view illustrating a plurality of member positions indicating a first rotation angle, in a state in which the operation member is not pressed down.
Figure 16B:
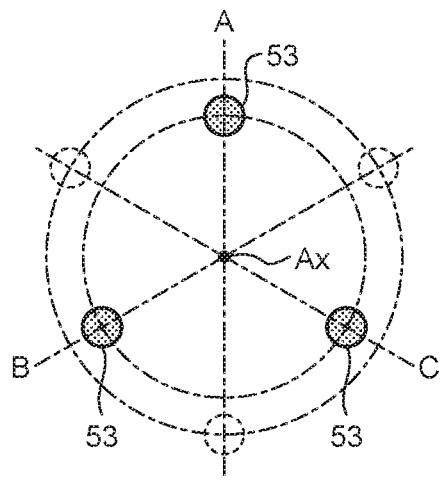
FIG. 16B is a plan view illustrating a plurality of member positions indicating a first rotation angle, in a state in which the operation member is pressed down to the first stage.

FIG. 14 is an explanatory diagram for schematically explaining the capacitance detected by a first member, when the initialization process of a coordinate input device is started, while the operation support device is mounted on the coordinate input device. FIG. 15 is an explanatory diagram for schematically explaining the capacitance detected by a first member, when the initialization process of the coordinate input device is started, while the operation support device is mounted on the coordinate input device. FIG. 16A is a plan view illustrating a plurality of member positions indicating a first rotation angle, in a state in which the operation member is not pressed down. FIG. 16B is a plan view illustrating a plurality of member positions indicating a first rotation angle, in a state in which the operation member is pressed down to the first stage.

An example illustrated in FIG. 14 is a comparative example. As illustrated in FIG. 14, when the initialization process of the coordinate input device TP is started, while the operation knob 1 is mounted on the coordinate input device TP (step ST1), the coordinate input device TP stores a capacitance value Raw Data including the capacitance of the first member 53, as a base capacitance value Base line. In the present embodiment, the initialization process of the coordinate input device TP refers to a process of storing the capacitance value Raw Data as the base capacitance value Base line. The initialization process of the coordinate input device TP includes a process of storing the capacitance value Raw Data as the base capacitance value Base line in a state without contact with a conductor while the coordinate input device TP is operated, in addition to the process of storing the capacitance value Raw Data as the base capacitance value Base line when power is supplied to the coordinate input device TP.

When the operation knob 1 is rotated in one direction on the coordinate input device TP, the position of the first member 53 will change (step ST2). The coordinate input device TP outputs a detection capacitance value Signal Data obtained by subtracting the stored base capacitance value Base line from the capacitance value Raw Data including the capacitance of the first member 53, and outputs a signal value Signal of the first member 53.

Upon rotating the operation knob 1 in a reverse direction on the coordinate input device TP, and causing the first member 53 to return to the position where the initialization process of the coordinate input device TP is started (step ST1), when the detection capacitance value Signal Data that is obtained by subtracting the stored base capacitance value Base line from the capacitance value Raw Data including the capacitance of the first member 53 is output, the capacitance value of the first member 53 is offset by the base capacitance value Base line. Consequently, the signal value Signal of the first member 53 will not be output.

Compared to the comparative example described above, the first end part 52 of the first member 53 of the present embodiment is mounted on the coordinate input device TP, but the first end part 52 of the first member 53 is in a floating state. As illustrated in FIG. 15, when the initialization process of the coordinate input device TP is started, while the operation knob 1 is mounted on the coordinate input device TP (step ST1), the coordinate input device TP stores the capacitance value Raw Data as the base capacitance value Base line. In this process, because the first end part 52 of the first member 53 is in a floating state, the capacitance value of the first end part 52 of the first member 53 hardly affects the capacitance value Raw Data.

For example, as illustrated in FIG. 16A, in a state in which the initialization process of the coordinate input device TP is started and the operation member 3 is not pressed down, the coordinate input device TP does not detect any of the three first members 53 and the three second members 63.

As illustrated in FIG. 10, when a hand is placed on the operation member 3, and the operation member 3 is pressed down to the first stage (step ST3), in conjunction with the operation member 3, the first shaft part 51 and the first end part 52 come into contact with each other. Because the first shaft part 51 and the first end part 52 are conductive members, the capacitance of the first member 53 that is the total capacitance of the first shaft part 51 and the first end part 52 becomes larger than the capacitance of the first end part 52. The coordinate input device TP outputs the detection capacitance value Signal Data obtained by subtracting the stored base capacitance value Base line from the capacitance value Raw Data of the first member 53, and outputs the signal value Signal of the first member 53. Consequently, as illustrated in FIG. 16B, the three first members 53 are detected by the coordinate input device TP. The control device 101 can calculate the coordinates of the center axis Ax, from the coordinates of the three first members 53. For example, when the coordinates of the operation knob 1 is set as the coordinates of the center axis Ax, the control device 101 can acquire the position of the operation knob 1 on the XY plane.

Figure 16C:
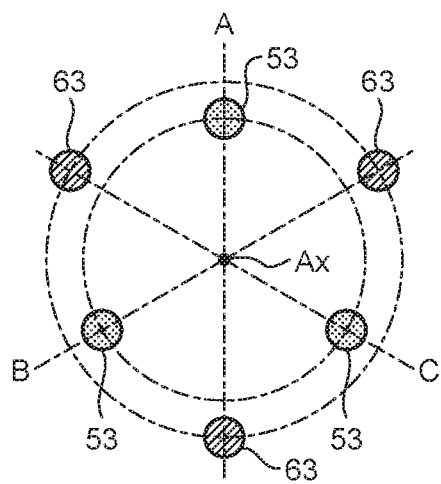
FIG. 16C is a plan view illustrating a plurality of member positions indicating a first rotation angle, in a state in which the operation member is pressed down to the second stage.
Figure 16D:
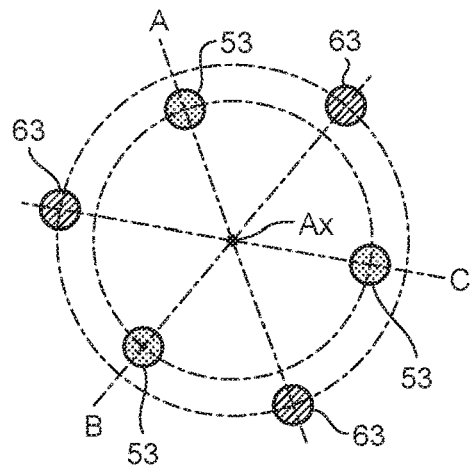
FIG. 16D is a plan view illustrating a plurality of member positions indicating a second rotation angle, in a state in which the operation member is pressed down to the second stage.
Figure 16E:
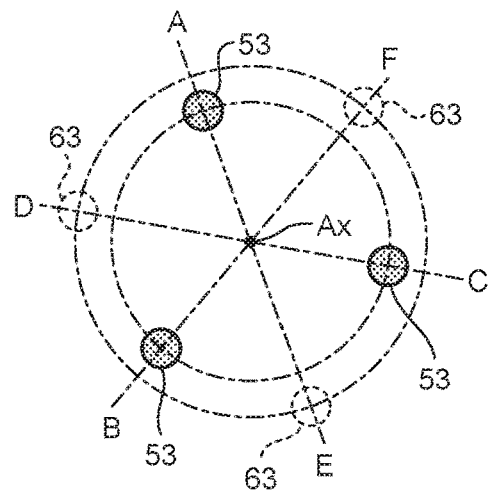
FIG. 16E is a plan view illustrating a plurality of member positions indicating a second rotation angle, in a state in which the operation member is pressed down to the first stage.
Figure 16F:
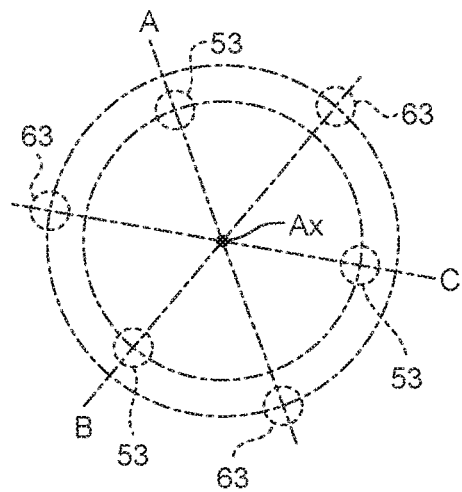
FIG. 16F is a plan view illustrating a plurality of member positions indicating a second rotation angle, in a state in which the operation member is not pressed down.

FIG. 16C is a plan view illustrating a plurality of member positions indicating a first rotation angle, in a state in which the operation member is pressed down to the second stage. FIG. 16D is a plan view illustrating a plurality of member positions indicating a second rotation angle, in a state in which the operation member is pressed down to the second stage. FIG. 16E is a plan view illustrating a plurality of member positions indicating a second rotation angle, in a state in which the operation member is pressed down to the first stage. FIG. 16F is a plan view illustrating a plurality of member positions indicating a second rotation angle, in a state in which the operation member is not pressed down.

As illustrated in FIG. 16A to FIG. 16F, directions toward which the first members 53 are located from the center axis Ax are represented by the azimuth A, the azimuth B, and the azimuth C. Directions toward which the second members 63 are located from the center axis Ax are represented by the azimuth D, the azimuth E, and the azimuth F. The first members 53 are disposed around the center axis Ax, at positions shifted by 60 degrees from the second members 63. As illustrated in FIG. 16B, the three first members 53 are detected by the coordinate input device TP. Consequently, the control device 101 can calculate the azimuth A, the azimuth B, and the azimuth C toward which the first members 53 are located.

As illustrated in FIG. 16C, the coordinate input device TP detects the three second members 63. Consequently, the coordinate input device TP can detect the rotation operation $R_{OP}$ of the operation knob 1.

When the operation knob 1 is rotated to the left from the first rotation angle as illustrated in FIG. 16C toward the second rotation angle as illustrated in FIG. 16D, the control device 101 can acquire the rotation angle of the operation knob 1, by calculating the angle difference between the direction from the center axis Ax toward the azimuth A in FIG. 16D, and the direction from the center axis Ax toward the azimuth A in FIG. 16C. In this example, the azimuth A is explained. However, the calculation performed on the basis of the azimuth A may also be performed on the basis of the azimuth B, the azimuth C, the azimuth D, the azimuth E, and the azimuth F.

Next, when the pressing operation $P_{OP}$ of the operation knob 1 is cancelled while a hand is placed on the operation member 3, from the state in which the pressing operation $P_{OP}$ is applied, as illustrated in FIG. 16E, the coordinate input device TP detects the three first members 53 but does not detect the three second members 63, as illustrated in FIG. 16E. When the coordinate input device TP detects the three first members 53, but does not detect the three second members 63, the input system 100 performs the process assuming that the pressing operation $P_{OP}$ of the operation knob 1 is cancelled.

Next, when the hand is released from the operation member 3, from the state in which the pressing operation $P_{OP}$ of the operation knob 1 is cancelled while the hand is placed on the operation member 3, as illustrated in FIG. 16E, the coordinate input device TP does not detect the three first members 53 and the three second members 63 as illustrated in FIG. 16F. When the hand is released from the operation member 3, as illustrated in FIG. 5, the first shaft part 51 presses the first rotation plate 5 and the supporting plate 4 upward, by the repulsive force generated between the first shaft part 51 and the first end part 52. Consequently, the upper surface of the supporting plate 4 is brought into contact with the positioning part 21 of the main axis supporting member 2. As a result, the capacitance value of the first end part 52 is offset by the base capacitance value Base line, and the signal value Signal of the first member 53 will not be output.

Next, an example will be described in which another operation is applied to the operation knob 1. When the operation knob 1 is rotated to the left from the first rotation angle as illustrated in FIG. 16B toward the second rotation angle as illustrated in FIG. 16E, the control device 101 can acquire the rotation angle of the operation knob 1, by calculating the angle difference between the direction from the center axis Ax toward the azimuth A in FIG. 16B and the direction from the center axis Ax toward the azimuth A in FIG. 16E. In this example, the azimuth A is explained. However, the calculation performed on the basis of the azimuth A may also be performed on the basis of the azimuth B or the azimuth C.

Figure 16G:
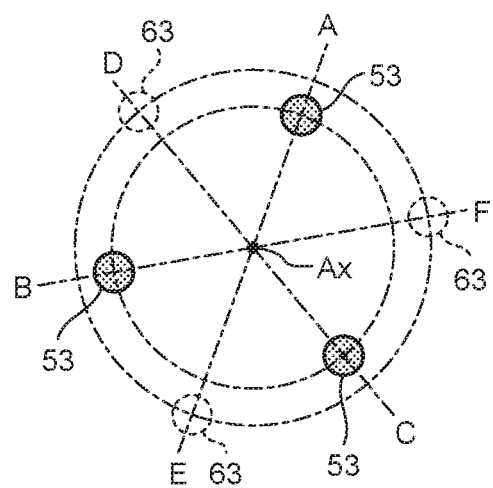
FIG. 16G is a plan view illustrating a plurality of member positions indicating a third rotation angle, in a state in which the operation member is pressed down to the first stage.

The coordinate input device TP can also detect the members when the operation knob 1 is rotated to the right. FIG. 16G is a plan view illustrating a plurality of member positions indicating a third rotation angle, in a state in which the operation member is pressed down to the first stage. When the operation knob 1 is rotated to the right from the first rotation angle as illustrated in FIG. 16B toward the third rotation angle as illustrated in FIG. 16G, the control device 101 can acquire the rotation angle of the operation knob 1, by calculating the angle difference between the direction from the center axis Ax toward the azimuth A in FIG. 16B, and the direction from the center axis Ax toward the azimuth A in FIG. 16G. In this example, the azimuth A is explained. However, the calculation performed on the basis of the azimuth A may also be performed on the basis of the azimuth B or the azimuth C.

Figure 16H:
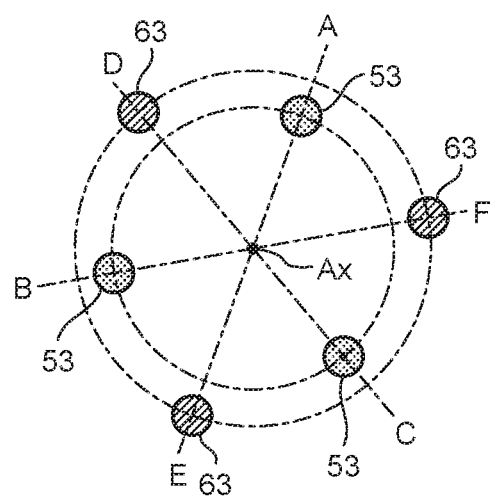
FIG. 16H is a plan view illustrating a plurality of member positions indicating a third rotation angle, in a state in which the operation member is pressed down to the second stage.

FIG. 16H is a plan view illustrating a plurality of member positions indicating a third rotation angle, in a state in which the operation member is pressed down to the second stage. As illustrated in FIG. 16G, the coordinate input device TP detects the three second members 63. Consequently, the coordinate input device TP can detect the rotation operation $R_{OP}$ of the operation knob 1.

When the operation knob 1 is rotated to the right from the first rotation angle as illustrated in FIG. 16C toward the third rotation angle as illustrated in FIG. 16G, the control device 101 can acquire the rotation angle of the operation knob 1, by calculating the angle difference between the direction from the center axis Ax toward the azimuth A in FIG. 16C, and the direction from the center axis Ax toward the azimuth A in FIG. 16G. In this example, the azimuth A is explained. However, the calculation performed on the basis of the azimuth A may also be performed on the basis of the azimuth B, the azimuth C, the azimuth D, the azimuth E, and the azimuth F.

As described above, the operation knob 1 is an operation support device that supports an input operation to the coordinate input device TP for detecting a change in the electrostatic capacitance. The operation knob 1 includes the operation member 3 that can be pressed down toward the coordinate input device TP, the first rotation plate 5 that moves in the vertical direction in conjunction with the operation member, and the first member 53. The first member 53 includes the first shaft part 51 that protrudes from the first rotation plate 5 toward the coordinate input device TP, and the first end part 52. The first shaft part 51 and the first end part 52 come into contact with each other, in conjunction with the pressing operation performed on the operation member 3 to the first stage. Consequently, even when the initialization process of the coordinate input device TP is started, while the operation knob 1 is installed on the coordinate input device TP, if the pressing operation $P_{OP}$ is performed on the operation member 3, it is possible to input the coordinates of the operation knob 1 on the coordinate input device TP. The operation knob 1 of the present embodiment may be installed on the coordinate input device TP after activating the initialization process of the coordinate input device TP. Alternatively, the initialization process of the coordinate input device TP may be activated, while the operation knob 1 is installed on the coordinate input device TP.

The operation knob 1 includes the second rotation plate 6 and the second member 63. The second rotation plate 6 moves in the vertical direction in conjunction with the operation member 3. The second member 63 includes the conductive second shaft part 61 that protrudes from the second rotation plate 6 toward the coordinate input device TP, and the conductive second end part 62 mounted on the coordinate input device TP. In conjunction with the pressing operation $P_{OP}$ performed on the operation member 3, the second shaft part 61 and the second end part 62 come into contact with each other. Consequently, the coordinate input device TP detects the three second members 63.

The operation knob 1 includes the main axis supporting member 2 mounted on the coordinate input device TP, the supporting plate 4, and the coupling member 7 that couples the operation member 3 and the second rotation plate 6. The supporting plate 4 is provided outside of the main axis supporting member 2 in the radial direction, and is located above the first rotation plate 5 and the second rotation plate 6. Consequently, with the pressing operation performed on the operation member 3 to the first stage, and the pressing operation performed on the operation member 3 to the second stage, it is possible to change the relative positional relation between the supporting plate 4, the first rotation plate 5, and the second rotation plate 6. In conjunction with the pressing operation performed on the operation member 3 to the first stage, the supporting plate 4, the first rotation plate 5, and the second rotation plate 6 integrally move downward. In conjunction with the pressing operation performed on the operation member 3 to the second stage, the supporting plate 4 and the first rotation plate 5 do not move, and the second rotation plate 6 is separated from the supporting plate 4.

The three first members 53 are disposed around the center axis Ax of the main axis supporting member 2 at every 120 degrees. The second members 63 are disposed around the center axis Ax of the main axis supporting member 2 at every 120 degrees, at positions other than on the line connecting the center axis Ax of the main axis supporting member 2 and each of the first members 53. Consequently, even when the initialization process of the coordinate input device TP is started, while the operation knob 1 is installed on the coordinate input device TP, as illustrated in FIG. 1, when the pressing operation $P_{OP}$ is performed on the operation member 3, as illustrated in FIG. 16B, it is possible to output the positions of the second members 63. As a result, the control device 101 can estimate the positions of the first members 53, and store the positions of the first members 53 at the point when the initialization process of the coordinate input device TP is performed, in the internal storage device 105.

When the operation member 3 is pressed down in an inclined manner, one or two second members 63 are detected. Consequently, the control device 101 does not identify such an operation as the pressing operation $P_{OP}$ performed on the operation knob 1. The control device 101 identifies that the pressing operation $P_{OP}$ is performed on the operation knob 1, when the operation member 3 is pressed down and the three second members 63 are detected. It is possible to prevent an erroneous operation from being performed, when the control device 101 executes the process assigned to the pressing operation $P_{OP}$ of the operation knob 1, only when such an operation is identified.

In this manner, a preferred embodiment has been described. However, the present disclosure is not limited to such an embodiment. What has been described in the embodiment is merely an example, and various modifications may be made within the scope of the present disclosure. Appropriate modifications made within the spirit of the present disclosure naturally belongs to the technical scope of the present disclosure.

For example, the plane defined by the direction X and the direction Y is the upper surface TPF of the coordinate input device TP. However, the upper surface TPF of the coordinate input device TP may also be curved. The touch panel is used as the coordinate input device TP, but the coordinate input device TP may also be a touch pad without a display function.

The magnet is used for the attractive force and the repulsive force. However, a member such as rubber and a spring may also be used as a substitute.

What is claimed is:

1. An operation support device that supports an input operation to a coordinate input device for detecting a change in electrostatic capacitance, the operation support device, comprising:

an operation member;

a first rotation plate that moves in a vertical direction in conjunction with the operation member;

a first member that includes a conductive first shaft part that protrudes from the first rotation plate toward the coordinate input device, and a conductive first end part;

a second rotation plate that moves in a vertical direction in conjunction with the operation member; and a second member that includes a conductive second shaft part that protrudes from the second rotation plate toward the coordinate input device, and a second end part;

a main axis supporting member mounted on the coordinate input device;

a supporting plate that is provided outside of the main axis supporting member in a radial direction, and that is placed above the first rotation plate and the second rotation plate; and a coupling member that couples the operation member and the second rotation plate, wherein in conjunction with a pressing operation performed on the operation member to a first stage, the first shaft part and the first end part come into contact with each other, and in conjunction with a pressing operation performed on the operation member to a second stage that is larger than the pressing operation performed on the operation member to the first stage, the second shaft part and the second end part come into contact with each other.

2. The operation support device according to claim 1, wherein in conjunction with the pressing operation performed on the operation member to the first stage, the supporting plate, the first rotation plate, and the second rotation plate integrally move downward.

3. The operation support device according to claim 1, wherein in conjunction with the pressing operation performed on the operation member to the second stage, the supporting plate and the first rotation plate do not move, and the second rotation plate separates from the supporting plate.

4. The operation support device according to claim 1, wherein the second members include three second members disposed around a center axis of the main axis supporting member at every 120 degrees, and the first members include three first members disposed around the center axis of the main axis supporting member at every 120 degrees, at positions other than on a line connecting the center axis of the main axis supporting member and each of the second members.

5. The operation support device according to claim 2, wherein the second members include three second members disposed around a center axis of the main axis supporting member at every 120 degrees, and the first members include three first members disposed around the center axis of the main axis supporting member at every 120 degrees, at positions other than on a line connecting the center axis of the main axis supporting member and each of the second members.

6. The operation support device according to claim 3, wherein
the second members include three second members disposed around a center axis of the main axis supporting member at every 120 degrees, and
the first members include three first members disposed around the center axis of the main axis supporting member at every 120 degrees, at positions other than on a line connecting the center axis of the main axis supporting member and each of the second members.

* * * * *